May 24, 1932.   S. W. BRIGGS   1,860,229
PRESSURE FILTER
Filed Dec. 31, 1930
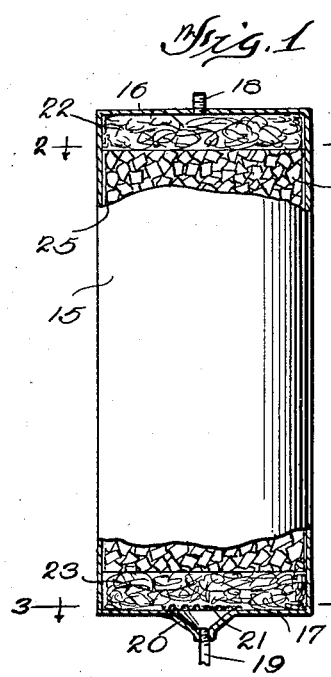
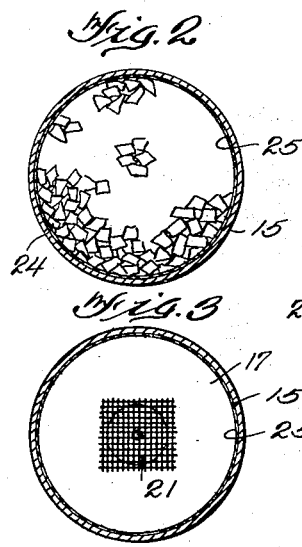
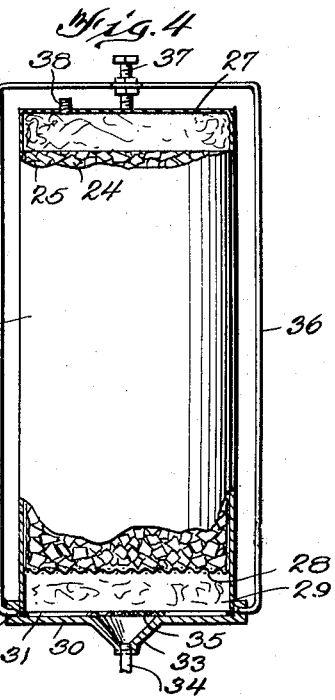
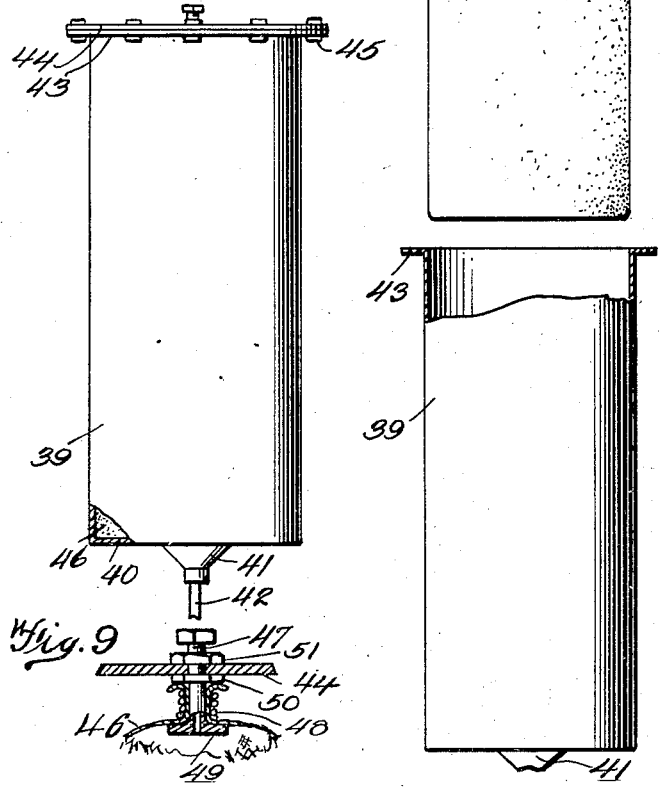
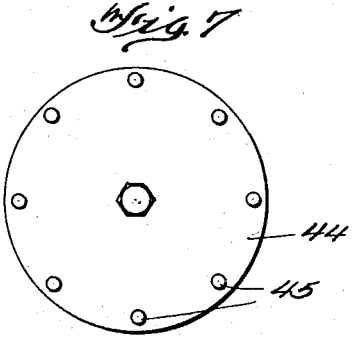
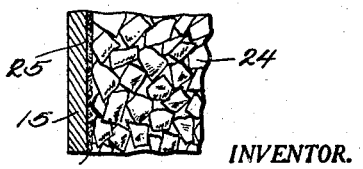
INVENTOR.
S. W. Briggs,
BY Mawhinney & Mawhinney,
ATTORNEYS Patented May 24, 1932

1,860,229

UNITED STATES PATENT OFFICE

SOUTHWICK W. BRIGGS, OF GLENMONT, MARYLAND

PRESSURE FILTER

Application filed December 31, 1930. Serial No. 505,913.

The present invention relates to pressure filters, particularly of the small compact type adapted especially for use in the lubricating systems of internal combustion engines, and the like.

In filters of this type a closed container is employed and a body of filtering or bleaching material, such as fuller's earth, is placed in the container between the inlet and the outlet for the oil. To obtain maximum efficiency in a filter of small diameter, it is essential to utilize the entire cross sectional area of the container and the filtering material and also to prevent the channelling of the material at the inner wall of the container. This latter feature has been attempted in large structures where filter beds are employed and where the liquid settles through the filtering material by gravity. In such instances the filtering material is surrounded near the top with a material which is more compact and of finer particles than that of the filtering material, and hence of a different character than that of the same. This construction reduces the effective cross sectional area of the filter and does not considerably reduce the working cross sectional area in a large filter of the gravity type, but is a decided disadvantage in a small filter of the pressure type where the filter must be compact, light in weight and treat a relatively large volume of oil.

It is therefore an object of this invention to prevent channelling at the sides of the container and at the same time utilize the entire cross sectional area of the container and filtering material and insure an even constant flow of the oil under pressure through the filter.

Another object of the present invention is to provide a small pressure filter wherein the filtering material is identical and uniform not only throughout the entire cross sectional area of the container but also throughout the entire length of the body of the filtering material to thus insure the even spreading of the oil and the uniform filtering thereof.

A further object of the invention is to provide a structure wherein a granular filtering material, such as fuller's earth, may be employed and wherein, when the filter is subjected to vibration incident to shipping, handling and installation, the filtering material will be held from shifting and abrading against the side of the container and from grinding into a fine powder.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a side elevation, partly in section, of a filter constructed in accordance with this invention.

Figure 2 is a transverse section taken through the upper end thereof substantially on the line 2—2 of Figure 1.

Figure 3 is a similar view through the lower end of the filter on the line 3—3 of Figure 1.

Figure 4 is a side elevation, partly in section, of a modified form of filter.

Figure 5 is a side elevation, partly in section, of a further modified form of the invention, the cover of the container being removed and the filtering material being withdrawn from the container.

Figure 6 is a like view with the parts assembled.

Figure 7 is a top plan view thereof.

Figure 8 is a fragmentary enlarged section of the filter of Figure 1, and

Figure 9 is a detail sectional view of the pipe connection for the filtering material bag used in the modified form of Figures 5 and 6.

Referring now to the drawings, and first to Figures 1, 2, 3 and 8, 15 designates a filter casing which may be of metal, is cylindrical in shape and is closed by top and bottom heads 16 and 17 which may be permanently secured thereon as shown. Oil to be filtered is fed under pressure from an oil pump or the like into the nipple 18 mounted through top head 16 while an outlet pipe 19 is connected to a centrally disposed well or depression 20 in the bottom head 17 for carrying off the filtrate or oil after treatment. The well 20 is covered by a screen 21 which is attached to the inner side of the head 17 over the well 20 and which may be of Monel metal filter cloth of two hundred mesh, or otherwise as desired.

In the top and bottom portions of the casing 15 may be placed small quantities or layers 22 and 23 of wool, gravel or other suitable oil spreading material. Either one or both of these spreading layers 22 and 23 may be omitted.

The intermediate portion of the casing 15 is filled with a body 24 of filtering or bleaching clay, such as fuller's earth of a 30-60 proportion, which entirely fills the cross sectional area of the casing 15 and extends between the spreading layers 22 and 23.

For holding the body 24 of filtering material from shifting in the casing and rubbing and grinding against the inner wall of the casing 15, and also to prevent channelling or free flowing of the oil about the body 24 against the wall of the casing, a thin layer or coating 25 of shellac or the like is placed over the inner wall of the casing 15 and extends at least throughout the length of the filtering body 24. The layer of shellac 25 receives therein the adjacent projections and edges of the granules of the filter clay to anchor the latter from movement relative to the casing 15, and also to partly close the spaces between the granules and the wall of the casing so that the same resistance to the passage of the oil is offered next to the casing as is encountered throughout the entire cross sectional area of the filtering body 24.

In one method of the manufacture of this form of the invention, the inner wall of the casing 15 may first be sprayed with a thin coating of the shellac, and before the shellac dries a small qantity of the filtering clay 24 may be blown or otherwise introduced into the casing and the latter rotated so as to spread the clay over the film of shellac 25. Thus a thin layer of the clay adheres to the inner wall of the container and when the shellac dries becomes practically a part thereof, and when the body of the filtering material 24 is placed in the casing it intermeshes with the adhering layer of the same substance.

The filter thus contructed is small in size and compact and may be installed on the side of an internal combustion or on any other suitable support and is not affected by vibration as the filtering body 24 is securely held from shifting. The anchoring layer 25 also protects the filter during shipping and handling.

In operation, the oil under pressure enters into the top of the filter through the nipple 18 and is spread out over the top layer 22. The oil then is forced downwardly through the filtering body 24 and travels uniformly and evenly therein throughout the length and cross sectional area of the body. The filtrate leaves the lower end of the filtering body and enters the bottom layer 23 of waste, wool or the like and the oil finally passes through the screen 21, well 20 and out through the pipe 19.

In the modification illustrated in Figure 4, the casing 26 may be of sheet metal with a closed top head 27 and which is open at its lower end. A screen 28 is soldered or otherwise secured in the lower open end of the casing 26 and is spaced above the lower edge of the casing to provide a space 29 beneath the screen. A bottom plate 30 abuts the lower edge of the casing 26 with a sealing gasket 31 therebetween and the plate has a marginal upstanding flange 32 engaging about the lower end of the casing.

The bottom plate 30 has a central well 33 connected to an outlet pipe 34, and a Monel metal screen 35 covers the well. A bail 36 is hinged to the opposite sides of the flange 32 and extends over the top of the casing, and a set screw 37 is carried by the bail and binds against the top head 27 of the casing to firmly seat the latter on the bottom plate 30. The top head 27 carries a nipple 38 for receiving the oil under pressure.

The casing 26 carries the filtering body 24 in the manner heretofore described, and may be substituted or interchanged by releasing the bail 36 and swinging it to one side to free the casing.

Another modification of the invention is shown in Figures 5, 6, 7 and 9. The casing 39 has a closed bottom 40 with a central well 41 opening into the outlet pipe 42. The casing 39 is open at its upper end and has thereat an out-turned flange 43 to which is detachably secured a cover plate or head 44 removably held in place by bolts 45 or the like.

The casing 39 carries a body of filtering or bleaching clay 24 as in the forms of the invention above described and which is anchored in place against the wall of the casing 39 by the adhesive coating 25, but the adhesive coating instead of being spaced or otherwise placed directly against the inner wall of the casing 39 is impregnated in a flexible, preferably fabric, sack or container 46 of suitable dimensions to snugly fit in the casing 39. The container 46 may be introduced through the top of the casing 39 and be withdrawn therefrom to provide an interchangeable filter unit.

The adhesive coating 25 of this form of the invention may comprise shellac including a certain proportion of resin so as to maintain the adhesive coating somewhat yieldable and flexible to closely conform to and interfit with the inner wall of the casing 39 for sealing the coating 25 thereagainst and thus effectively prevent channelling at the inner wall of the casing about the body of filtering material 24.

The container 46, as shown in Figure 6, is adapted to rest at its lower end upon the bottom 40 of the casing 39 and the upper end of the container 46 has its mouth or open end drawn together over the body 24 of filtering material and gathered about a threaded nipple 47 and secured in such position by a wire 48 or the like as shown in Figure 9, the nipple 47 having an enlarged head 49 at its lower inner end adapted to support the gathered-in mouth of the container or bag and thus effectively hold the nipple therein.

The nipple carries a threaded nut 50 immediately above the mouth of the container and the nut 50 is adapted to engage against the inner side of the cover plate 44 while a second nut 51 is threaded on the outer end of the nipple 47 and bears against the upper side of the plate 44 for holding the upper end of the bag in proper position and for securing the nipple 47 through the top plate. The nipple 47 provides an intake pipe into which oil under pressure may be introduced to the top of the filter.

The operation of the filter is identical as above described as the container 46 merely serves as a means for holding the body portion 24 of filtering clay together as a unit to facilitate the introduction and removal thereof in the assembling and interchange of the filtering unit.

It is obvious that various changes and modifications may be made in the details of construction and design of the above specifically described embodiment of this invention without departing from the spirit thereof, such changes and modifications being restricted only by the scope of the following claims.

What is claimed is:—

1. A filter comprising a casing, a coating of shellac on the inner wall of the casing, a body of filtering clay in the casing and having its outer portion partially embedded and anchored against relative shifting at the inner wall of the casing.

2. A filter comprising a closed casing having an inlet at its top and an outlet at its bottom with a well surrounding the outlet, screen cloth mounted in the casing under said well, layers of spreading material disposed in the top and bottom portions of the casing, an intermediate body of filtering material between said spreading layers, and a coating of shellac on the inner wall of the casing for engaging the outer portion of the body of filtering material to anchor the same and hold the particles of the filtering material against separation and displacement incident to vibration and passage of oil under pressure therethrough.

3. A filter comprising a casing open at one end, a closure plate for said end of the casing, a container removably fitting in the casing and having a nipple projecting through the cover plate, a body of filtering material in the container, and an anchoring layer embedded in the wall of the container for engagement with the body of filtering material and with the inner wall of said casing.

4. A filter comprising a casing open at its top and provided with an outlet well at its bottom, a container removably fitting in the casing, a body of filtering material in the container, a yieldable adhesive coating permeating the side walls of the container and anchoring the outer particles of the body of filtering material and sealing the same against the inner wall of the casing, an inlet nipple connected to the upper end of the container, and a cover plate secured to the casing and having an opening therethrough for receiving said inlet nipple.

5. In the method of manufacturing a filter, placing a thin coating of adhesive on the inner wall of a filter casing, placing a thin layer of a filtering material over the coating of adhesive and allowing the adhesive to set for anchoring the coating of filtering material on the inner wall of the casing, and subsequently filling the casing with a body of the filtering material.

6. In the method of manufacturing a filter, spraying the inner wall of a container with shellac, placing a quantity of a filtering material in the casing and rolling the latter to evenly distribute a layer of filtering material over the coating of shellac, and subsequently placing a body of the filtering material in the casing for intermeshing engagement with the layer of filtering material anchored in the shellac.

7. In the method of manufacturing a filter, placing a coating of an adhesive on the inner wall of a filter casing, then placing a body of filtering material in the casing against said coating and permitting the coating to dry, and seal the filtering material against the inner wall of the casing.

8. The method of treating a body of filtering material for use in a filtering casing, which consists in shaping the body of filtering material to conform to a filter casing, and placing a non-porous sealing coating about the shaped body of filtering material.

9. A pressure oil filter, comprising a casing, a body of filtering material in the casing, and an adhesive coating impervious to the liquid being filtered disposed between the inner wall of the casing and the body of filtering material, the outer portion of the body of filtering material being partly embedded in said adhesive coating.

In testimony whereof I affix my signature.

SOUTHWICK W. BRIGGS.